Feb. 23, 1926.  F. F. BRUCKER  1,574,600
CORE OR MANDREL
Filed July 17, 1925

Inventor:
Ferdinand F. Brucker,
by Spear Middleton Donaldson & Hall
Attys.

Patented Feb. 23, 1926.

1,574,600

UNITED STATES PATENT OFFICE.

FERDINAND F. BRUCKER, OF AKRON, OHIO, ASSIGNOR TO THE MILLER RUBBER COMPANY, OF AKRON, OHIO, A CORPORATION OF OHIO.

CORE OR MANDREL.

Application filed July 17, 1925. Serial No. 44,321.

*To all whom it may concern:*

Be it known that I, FERDINAND F. BRUCKER, a citizen of the United States, and resident of Akron, in the county of Summit and State of Ohio, have invented certain new and useful Improvements in Cores or Mandrels, of which the following is a specification.

My present invention relates to improvements in cores or mandrels for the manufacture of inner tubes, and aims to provide a core by which a high grade of tube may be much more conveniently produced than heretofore.

The invention comprises a core of interrupted ring form and relatively flat in cross section.

For a better understanding of the invention reference is made to the accompanying drawing in which:—

Figure 1:
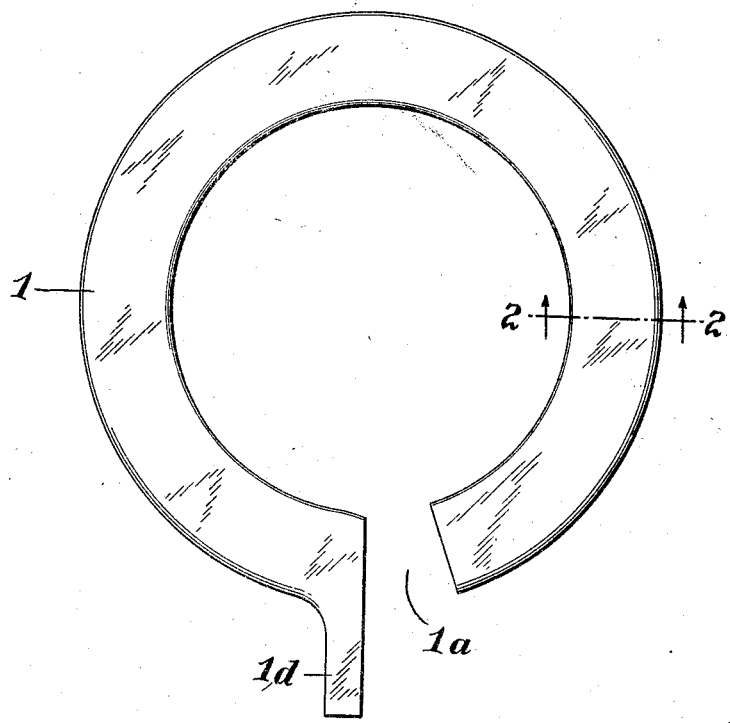
Figure 2:
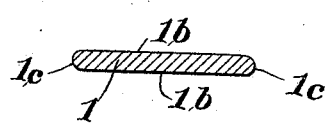

Figure 1 is a plan view of the core, and Fig. 2 is a section on line 2—2 of Fig. 1.

Referring by reference characters to this drawing, the numeral 1 designates the core which is made in the form of an interrupted ring having a space 1ᵃ for the application of the uncured tube and removal of the cured article.

It is made in the form of an annular disc with flat substantially parallel sides 1ᵇ and rounded edges 1ᶜ.

The core is provided at 1ᵈ with a substantially radial projection serving as a support during tube manipulation.

In using such a core or mandrel, the green tube may be formed in any suitable manner, as by an extruding machine, or rolling on a straight mandrel or pole, and it may then be blown onto the curved flat mandrel and placed in a heater for vulcanization, either with or without wrapping.

I have found that by vulcanizing the tube in curved form (the curvature being approximately that the tube assumes in the tire) an article is produced free from wrinkles or bulging when placed in the tire. By the use of a flat mandrel a great many more tubes may be vulcanized at one time in a single heater, thereby effecting a great saving in cost of heat, and in time. Furthermore, the flat mandrels are cheaper to construct, require less metal, and are correspondingly lighter and easier to handle.

It will be understood that after the vulcanized tube has been stripped from the mandrel, its ends are joined in the customary manner.

Having thus described my invention, what I claim is:—

A core or mandrel for forming inner tubes for pneumatic tires comprising a circular disc-like member in the form of a relatively thin flat interrupted ring having parallel side walls and rounded edges.

In testimony whereof I affix my signature.

FERDINAND F. BRUCKER.